United States Patent [19]

Masuda

[11] Patent Number: 5,628,288

[45] Date of Patent: May 13, 1997

[54] PRECOMBUSTION CHAMBER FOR DIESEL ENGINE

[75] Inventor: Tatsuyuki Masuda, Iwata, Japan

[73] Assignee: Yamaha Hatsudoki Kabushiki Kaisha, Iwata, Japan

[21] Appl. No.: 587,647

[22] Filed: Jan. 17, 1996

Related U.S. Application Data

[62] Division of Ser. No. 205,940, Mar. 3, 1994.

[30] Foreign Application Priority Data

Mar. 4, 1993 [JP] Japan ..................... 5-440057

[51] Int. Cl.⁶ ..................................... F02B 3/00
[52] U.S. Cl. ........................................... 123/273
[58] Field of Search ....................... 123/273, 270, 123/271, 193.5

[56] References Cited

U.S. PATENT DOCUMENTS

| | | | |
|---|---|---|---|
| 2,106,124 | 1/1938 | Ricardo | 123/273 |
| 3,916,851 | 11/1975 | Otani . | |
| 4,029,075 | 6/1977 | Noguchi et al. . | |
| 4,714,062 | 12/1987 | Toeda | 123/270 |
| 4,774,919 | 10/1988 | Matsuo et al. . | |

FOREIGN PATENT DOCUMENTS

| | | | |
|---|---|---|---|
| 49656 | 3/1939 | France . | |
| 913382 | 9/1946 | France . | |
| 2580341 | 4/1985 | France . | |
| 0188025 | 10/1984 | Japan | 123/271 |
| 0190617 | 9/1985 | Japan | 123/271 |
| 61-205323 | 9/1986 | Japan . | |
| 62-32331 | 10/1986 | Japan . | |
| 3121242 | 5/1991 | Japan . | |
| 545923 | 2/1974 | Switzerland . | |
| 625946 | 7/1949 | United Kingdom . | |
| 735834 | 8/1955 | United Kingdom . | |
| 1534761 | 12/1978 | United Kingdom | 123/271 |

OTHER PUBLICATIONS

European Search Report dated Jul. 5, 1994.

European Search Report dated Dec. 1, 1994.

Patent Abstract of Japan, vol. 11. No. 39 (M–559) (2486).

*Primary Examiner*—Marguerite McMahon
*Attorney, Agent, or Firm*—Knobbe, Martens, Olson & Bear LLP

[57] ABSTRACT

A cylinder head arrangement for an engine such as a diesel engine that includes a precombustion chamber. The precombustion is formed primarily by a recess formed in the main combustion chamber and an insert piece that is interlocked in any of a variety of different matters to the cylinder head casting. Various arrangements for achieving the interlocked are disclosed and these include pressing and/or welding.

5 Claims, 6 Drawing Sheets

PRECOMBUSTION CHAMBER FOR DIESEL ENGINE

This application is a divisional of U.S. patent application Ser. No. 08/205,940, filed Mar. 3, 1994.

BACKGROUND OF THE INVENTION

This invention relates to a precombustion chamber for a diesel engine and more particularly to an improved cylinder head and prechamber insert construction.

In many types of engines, particularly diesel engines, there is provided in addition to the main combustion chamber a sub or precombustion chamber in which combustion is initiated. The combustion from this prechamber then causes the mixture in the main chamber to ignite and normally some form of throat section interconnects the prechamber and the main chamber and through which the hot gases may emanate.

Although these types of constructions provide very good performance under all running conditions, the actual formation of the cylinder head and prechamber cause some problems. Specifically, in addition to forming a main combustion chamber surface, the interior of the cylinder head must be formed with the prechamber and the relatively narrow throat that connects the prechamber to the main chamber. It is not practical for a variety of reasons to form the cylinder head as a single unitary construction when a prechamber is employed. The reason for this is if the casting and machining techniques become very difficult due to the small throat that interconnects the prechamber with the main chamber.

Therefore, it has been the practice to form at least a portion of the prechamber in a cylinder head casting and to use a prechamber insert that is fixed somehow to the cylinder head and which forms the lower end of the prechamber and the throat which connects the prechamber to the main chamber.

Obviously, such multiple part constructions give rise to difficulties in assembly and maintaining the components together. For example, it could be disastrous to the engine if the insert piece were to fall out of the cylinder head during the engine operation. In addition, it is normally the practice to form the insert piece from a different material than the main cylinder head material and this gives rise to additional problems caused by uneven thermal expansions and cooling rates.

One way in which the insert piece has been affixed to the cylinder head is to form the insert piece and have it extend through an opening in a mating surface of the cylinder head. This insert piece is then held in place by a cap installed on the outside of the cylinder head. However, this type of construction presents considerable problems in conjunction with sealing since it is necessary to seal the insert piece and cylinder head around the entire opening in which the insert piece is received.

Another type of construction is shown in FIG. 1 of the drawings and this employs a multiple part construction. As may be seen in this figure, a portion of a diesel engine is illustrated and is identified generally by the reference numeral 11. This diesel engine 11 includes a cylinder block 12 having a cylinder bore 13 formed by an inserted liner 14. A piston 15 reciprocates in the cylinder bore 13 and drives a crank shaft (not shown) in a well known manner.

A cylinder head assembly, indicated generally by the reference numeral 16 is affixed to the cylinder block 12 in a known manner and this cylinder head assembly 16 includes a lower casting 17 that has a lower surface 18 that sealingly engages a cylinder head gasket 19 so as to provide a seal around the cylinder bore 13. A counterbored opening 21 is formed in the cylinder head casting 17 with its larger bore at the upper end and its smaller bore at the lower end where the main combustion chamber 22 is formed. A shoulder 23 is formed between these bore sections and an insert piece, indicated generally by the reference numeral 24, has two diameter sections terminating in a downwardly facing shoulder 25 that is abuttingly engaged with the cylinder bore shoulder 23 so as to fix the vertical location of the insert piece 24. The insert piece 24 is formed with a recess 26 which forms in part a precombustion chamber, indicated generally by the reference numeral 27. This prechamber recess 26 is offset to one side of the main combustion chamber 22 and is connected to it by a throat section 28 that extends generally to the center of the combustion chamber 22.

An upper cylinder head piece 29 is affixed to the lower cylinder head casting 17 and has a spherical section 31 which cooperates with the insert recess 26 to complete the formation of the prechamber 27 and so as to lock the insert piece 24 into position in the cylinder head portion 17.

A glow plug 32 and fuel injector 33 are supported in the upper cylinder head member 29 and project into the prechamber recess 27 for providing heat for initiating combustion at least during start up and for spraying fuel into the prechamber 27 and main combustion chamber 22 through the throat 28.

The engine 11 is also water cooled and this involves the formation of a cooling jacket 34 in the cylinder block, a coolant passage 35 in the lower cylinder head member 17 and a coolant jacket 36 in the upper cylinder head 29.

It should be readily apparent from this construction that there are a number of sealing surfaces which must be properly sealed both for water and compression purposes. In addition, the number of parts and complexity of the engine obviously increases.

It is, therefore, a principal object of this invention to provide an improved cylinder head structure forming a precombustion chamber which can minimize the number of parts and the effects of thermal differences.

SUMMARY OF THE INVENTION

This invention is adapted to be embodied in a cylinder head arrangement for an internal combustion engine that is comprised of a cylinder head member having a first surface adapted to sealingly engage around a cylinder bore of an associated cylinder block. The first surface surrounds a second surface which forms in part a main combustion chamber. The cylinder head member defines a cavity in said second surface forming at least in part a prechamber. An insert piece extends at least in part into the cavity for enclosing the cavity and forming a further portion of the prechamber. An opening in the insert piece communicates the prechamber with the combustion chamber. An interlocking means are carried by the inserted piece and the cylinder head member for affixing the insert piece to the cylinder head member.

DETAILED DESCRIPTION OF THE PREFERRED EMBODIMENTS OF THE INVENTION

Figure 10:
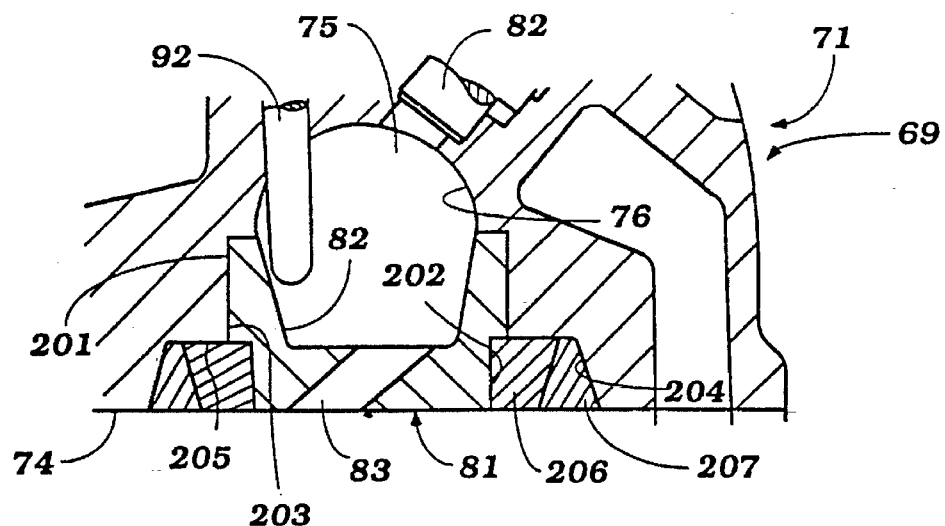
FIG. 10 is an enlarged cross-sectional view, in part similar to FIGS. 5, 8, and 9 and shows a fourth embodiment of the invention.
Figure 1:
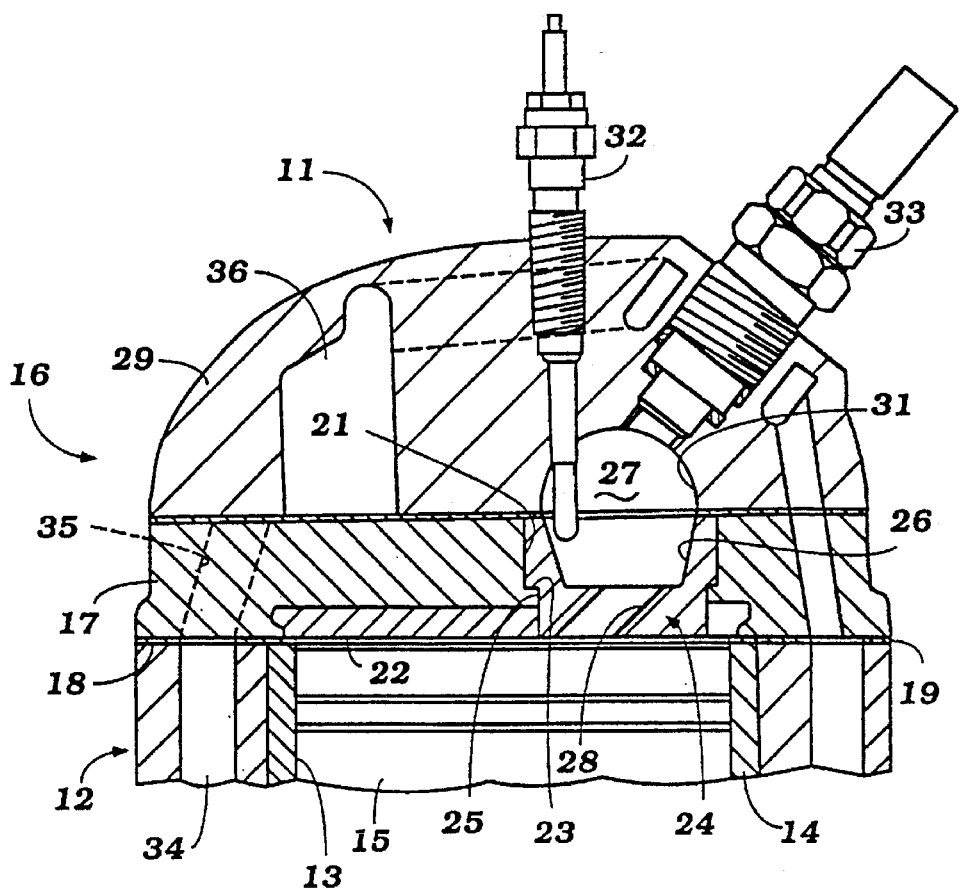
FIG. 1 is, as has been previously noted, a cross-sectional view taken through a portion of an engine constructed in accordance with a prior art type of arrangement.
Figure 2:
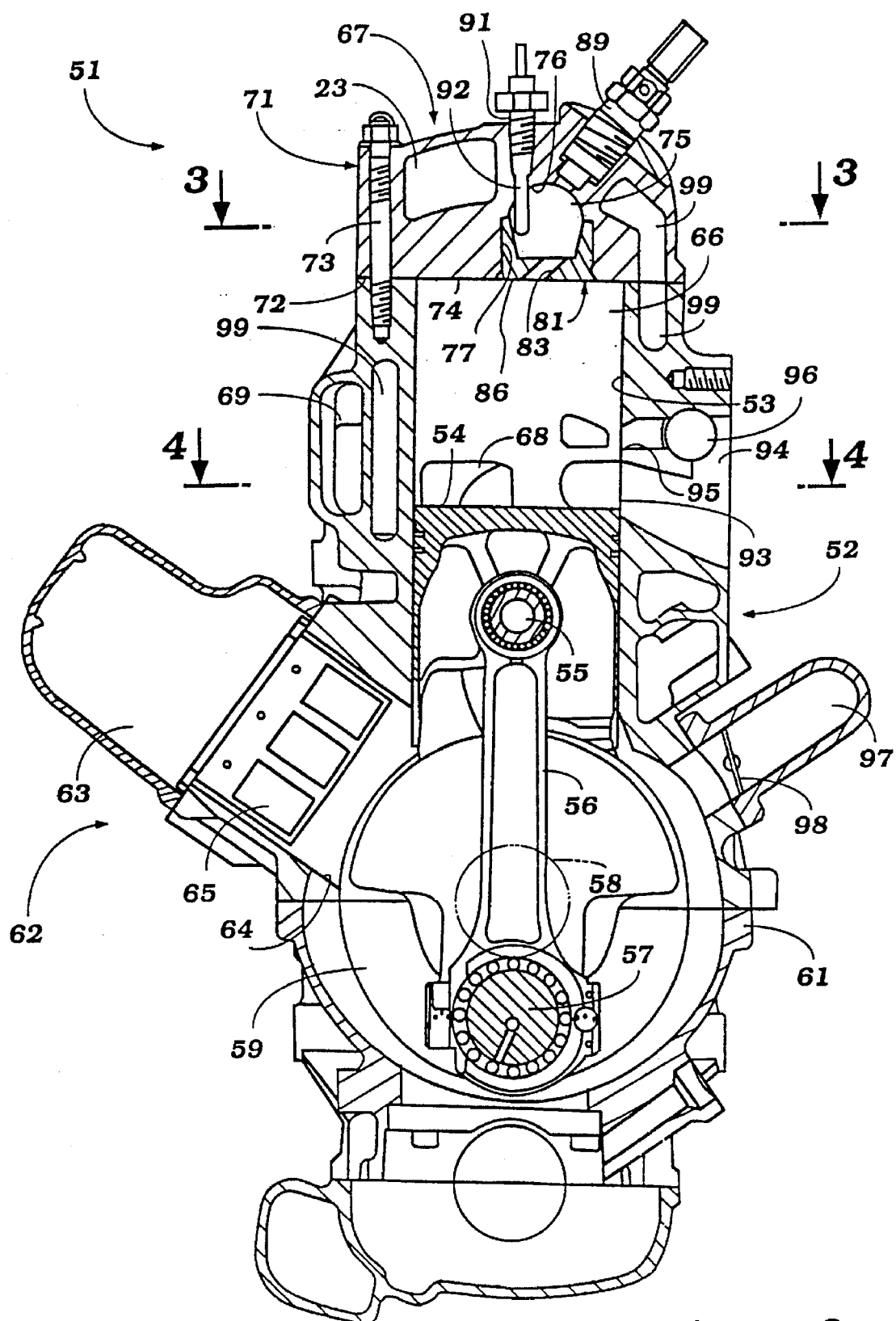
FIG. 2 is a cross-sectional view taken through a single cylinder of a three cylinder in-line type engine constructed in accordance with a first embodiment of the invention.
Figure 3:
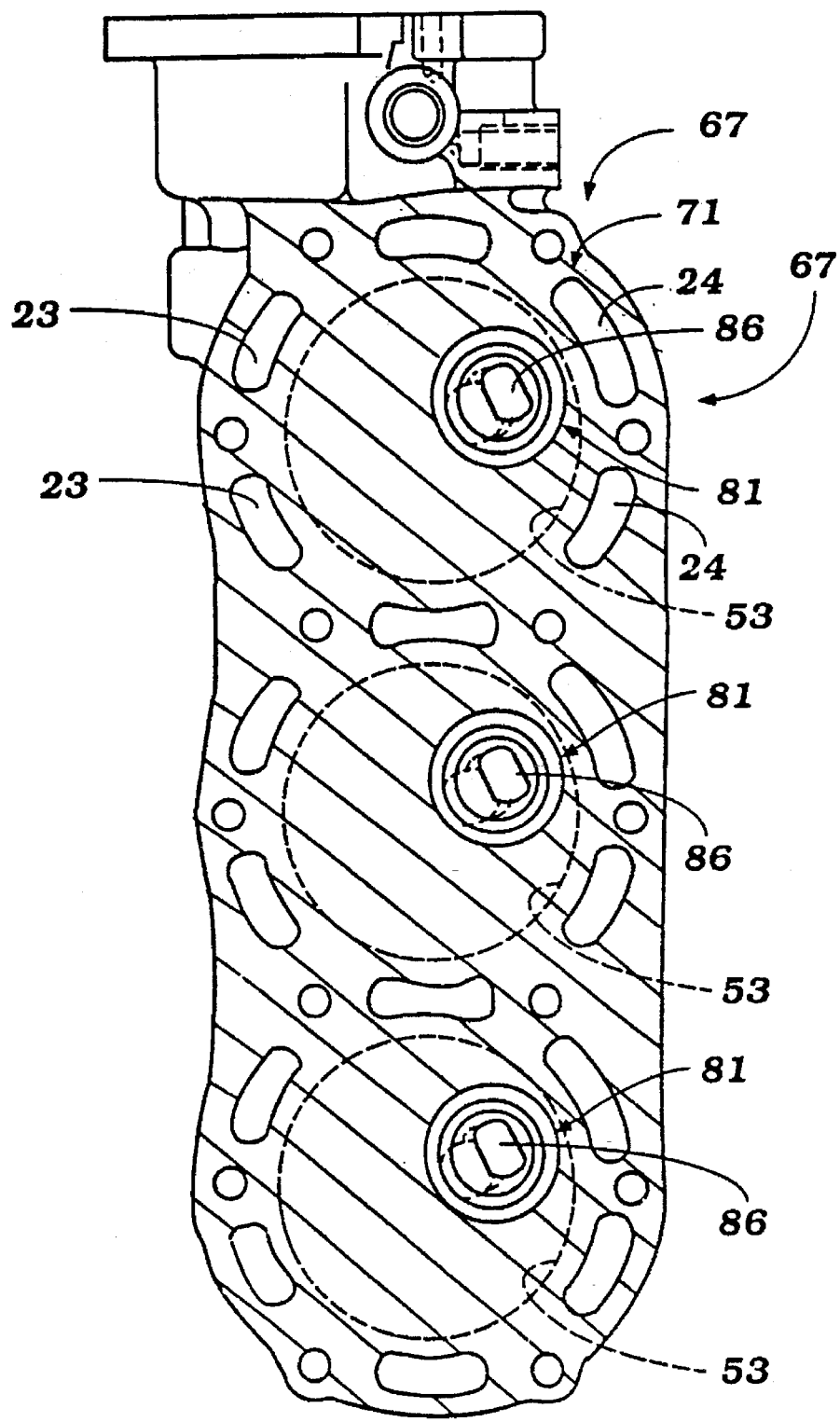
FIG. 3 is a cross-sectional view taken along the line 3—3 of FIG. 2.
Figure 4:
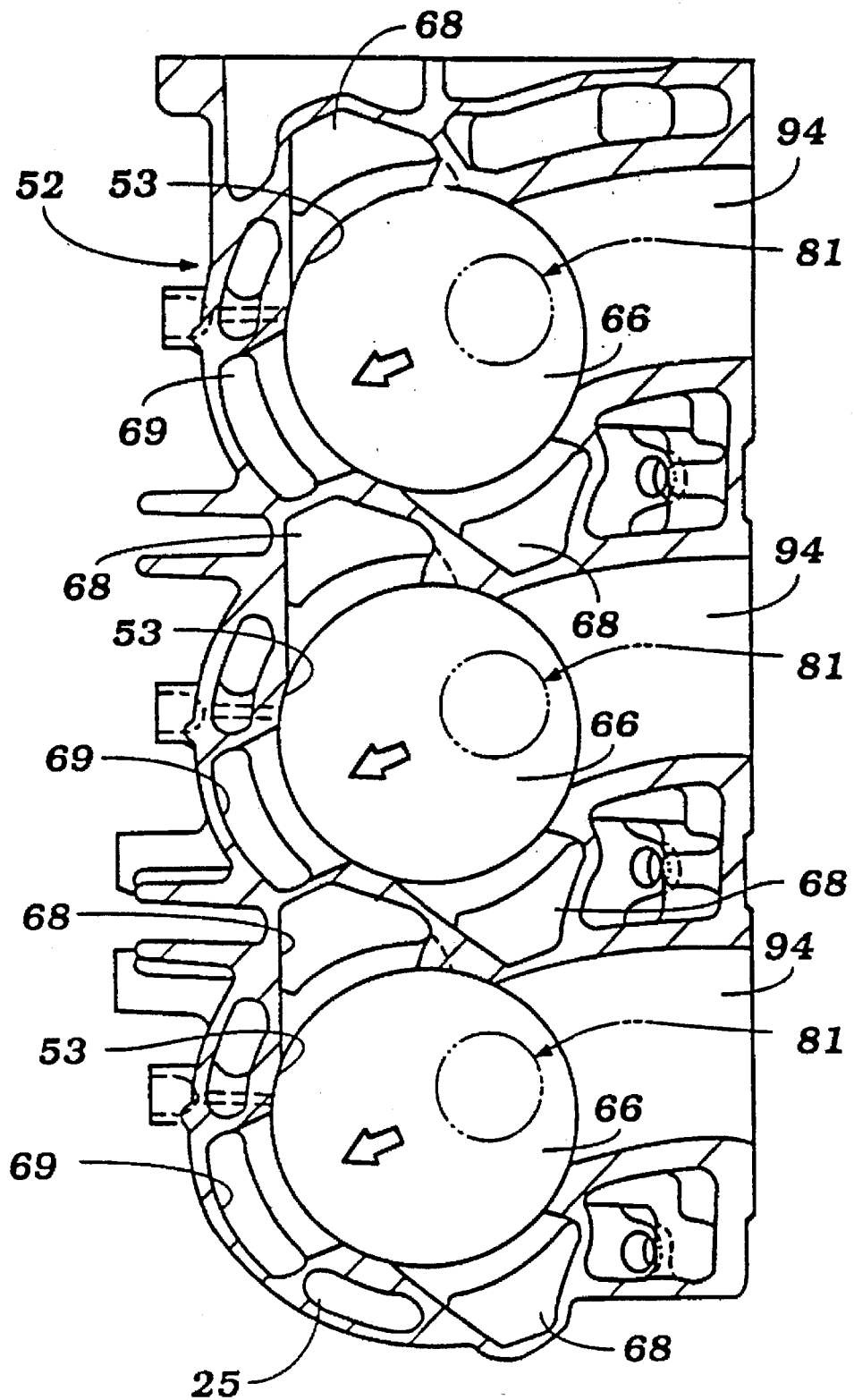
FIG. 4 is a cross-sectional view taken along the line 4—4 of FIG. 2.
Figure 5:
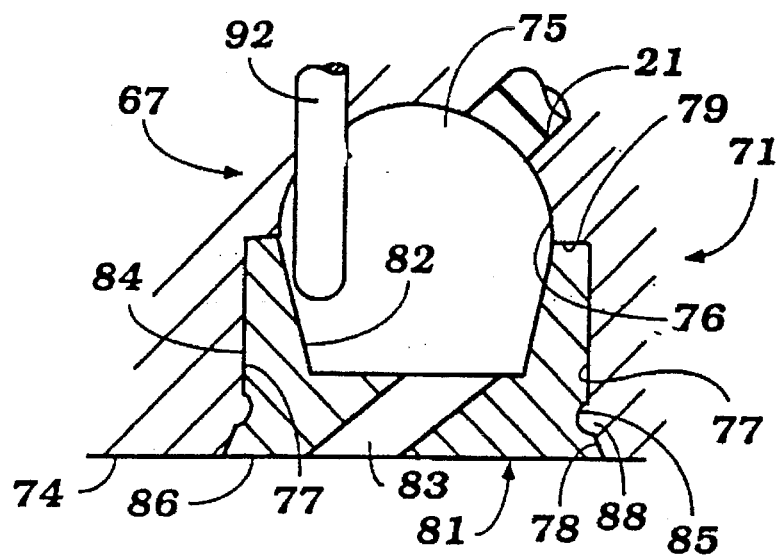
FIG. 5 is a further enlarged cross-sectional view of the area of the cylinder head showing the precombustion chamber and is taken along the same plane as FIG. 2.

Referring now in detail to the drawings and initially to the embodiment of FIGS. 2–5, an internal combustion engine constructed in accordance with an embodiment of the invention is identified generally by the reference numeral 51. The engine 51 is depicted as being of a three cylinder in-line type but will be readily apparent to those skilled in the art how the invention can be practiced with engines having other cylinder numbers and other cylinder configurations. In the illustrated embodiment, the engine 51 operates on a two-cycle crankcase compression diesel principle. Again, however, it will be readily apparent to those skilled in the art how the invention can be employed with engines operating on different cycles and with different combustion techniques (diesel or spark ignition). However, the invention has particular utility in conjunction with engines having precombustion chambers such as diesel engines.

The engine 51 includes a cylinder block assembly 52 in which three aligned cylinder bores 53 are formed in any known manner. Pistons 54 reciprocate within the cylinder bores 53 and are connected by means of piston pins 55 to the upper or small ends of connecting rods 56. Each connecting rod 56 has its lower or big end journalled on a respective throw 57 of a crankshaft 58 that is rotatably journalled in a known manner within a crankcase chamber 59 formed at the lower end of the cylinder block 52. This crankcase chamber 53 may be formed in part by the skirt of the cylinder block 52 and by a crankcase member 61 that is affixed in any known manner to the cylinder block 52. As is well known in this art, the crankcase chambers 59 associated with each of the cylinder bores 53 are sealed from each other in a known manner so as to facilitate the two cycle crankcase compression operation of the engine 51.

An intake air charge is delivered to the crankcase chamber 59 through an induction system, indicated generally by the reference numeral 62. This induction system includes an intake manifold 63 that draws an air charge through an air inlet device and which delivers it to each of a plurality of intake passages 64 formed at the lower end of the cylinder block 52 and which communicate with the crankcase chambers 59. Reed type valve assemblies 65 are provided in the intake passages 64 so as to permit the flow of the intake charge into the crankcase chambers 59 when the pistons 54 are moving upwardly in the cylinder bores 53 and for precluding reverse flow when the pistons 53 are moving downwardly so as to compress the charge in the crankcase chambers.

The charge which is drawn into the crankcase chambers 59 and compress therein is then transferred to a main combustion chamber, indicated generally by the reference numeral 66 and formed by the cylinder bore 53, piston 54, and by a cylinder head assembly 67 that is affixed to the cylinder block 52 in a manner which will be described. This transfer takes place through a pair of side scavenge passages 68 and a center scavenge passage 69 for each of the cylinder bores. As will be seen in FIG. 4, these passages are rotated slightly relative to a plane containing the axis of rotation of the crankshaft 58 so as to permit the length of the engine to be decreased. The scavenge passages 68 and 69 terminate in respective scavenge ports that are formed in the cylinder block and which communicate with the cylinder bore 53 in a well known manner.

The cylinder head assembly 67 is comprised of a main cylinder head casting member, indicated generally by the reference numeral 71 and which may be formed from a lightweight, highly heat conductive material such as aluminum or an aluminum alloy. Conveniently, the main cylinder head member 71 may be formed by casting. The cylinder head member 71 has a lower surface 72 that is in sealing relationship with the cylinder block 52 around the cylinder bores 53. A cylinder head gasket (not shown) may be interposed between the cylinder head surface 72 and cylinder block 52 for sealing purposes, as is well known in this art. Threaded fasteners 73 affix the cylinder head members 72 to the cylinder block 52.

The cylinder head surface 72 surrounds a combustion chamber forming surface 74 which may, in fact, be coextensive with the sealing surface 72. This surface 74 forms with the cylinder bore 53 and heads of the pistons 54, the main combustion chambers 66 before referred to.

A precombustion chamber 75 is formed in the cylinder head assembly 67 in a manner now to be described. This precombustion chamber 75 is offset to one side of the cylinder bore 53 from the center of the cylinder bore. In a preferred arrangement, this offset is toward the side of the cylinder bore away from the center scavenge passage 69. This precombustion chamber 75 is formed by a spherical segment 76 formed integrally with the cylinder head member 71 and at the base of a counterbore 77 which is formed with a chamfer 78 at its lower end. This counterbore 77 forms a shoulder 79 which faces downwardly.

An insert piece, indicated generally by the reference numeral 81 is positioned within this counterbore 77 and affixed therein in a manner to be described. The insert piece 81 is formed preferably from a heat resistant steel, for example a steel designated as SUH 3 according to the Japanese Industrial Standards (JIS). This material has a lower heat conductivity than the aluminum of the main cylinder head member 71 and a lower thermal expansion than this main cylinder head member 71.

The insert piece is formed with a recessed area 82 which has a surface of a segment of a cone with the upper diameter thereof being equal to the spherical diameter of the spherical portion 76 of the main cylinder head member 71. The lower diameter may have any desired shape and thus the insert piece section 82 and cylinder head section 76 form the precombustion chamber volume 75 previously described.

A transversely extending throat 83 is formed in the lower end of the insert piece 81 and communicates the prechamber volume 75 with the main combustion chamber 66. This throat 83 is directed so that it will terminate substantially at the center of the cylinder bore 53 and direct the charge issuing therefrom downwardly into the cylinder bore 53 toward the scavenge port formed at the end of the center scavenge passage 69.

The insert piece 81 has a cylindrical outer surface 84 that is complementary in diameter to the cylinder head counterbore 77 and which terminates at its lower end in a circumferential recess 85. Below this recess 85, there is provided a tapered portion 86 that has a slightly lesser acute angle to the axis of the bore 77 than the chamfer 75 of the cylinder head member 71 but which is slightly greater in height than it. The insert piece 81 then terminates in a lower surface 86 through which the throat 83 extends.

Although the insert piece 81 may be fixed to the cylinder head member 71 merely by a mechanical bond, as will be described, in this embodiment of the invention the insert piece 81 is also affixed to the cylinder head member 71 by welding. To facilitate this, the outer surface and specifically the upper surface and cylindrical side surface 84 as well as the tapered surface 86 and recess 85 may be surface treated by aluminizing or copper plating.

Figure 6:
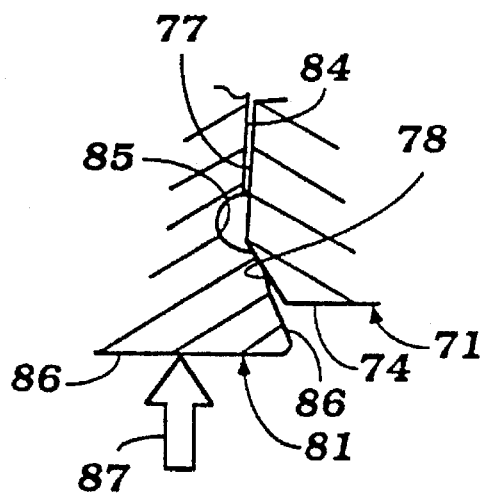
FIG. 6 is a further enlarged cross-sectional view, taken along the same plane as FIGS. 2 and 5 and shows a step during the insertion of the insert piece.

Once so treated, the insert piece 81 is inserted as shown in FIG. 6 and an electrical current is passed between it and the cylinder head member 71 so as to provide a resistance welding and heating of the components. Since the aluminum has a lower melting temperature, it will plastically deform; and as a pressure is applied to the insert piece 81, as shown by the arrow 87 in FIG. 6, the aluminum alloy of the cylinder heads 71 will heat and plastically deform, as shown at 88 in FIG. 7, into the groove 85. The corresponding tapered surface 86 and chamfered surface 78 of the cylinder head will facilitate this metal flow and ensure good interlocking in addition to the welding action that will also occur.

Figure 7:
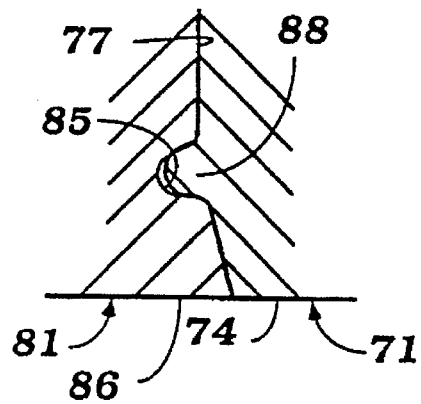
FIG. 7 is a further enlarged cross-sectional view, in part similar to FIG. 6, and shows the insert piece in its finally installed position.

This movement continues until the insert piece surface 86 is flush with the cylinder head surface 74, as shown in FIG. 7. Thus, the assembly will be completed and it will be ensured that the insert piece 81 will be rigidly held within the cylinder head, even though there may be slightly different thermal expansions and different heat transfer. Also, complete sealing of the prechamber 75 from the main chamber 66 except for the throat section 83 will be accomplished. Also, no external cylinder head sealing with the insert piece 81 is required as with previous attachment methods.

A fuel injector 89 is mounted in the cylinder head member 71 and sprays into the prechamber recess 75 and through the throat 86 into the main chamber 66. To assist in the initiation of starting and combustion, a glow-plug 91 may be positioned with its tip 92 in the prechamber recess 75.

As the piston 54 approaches the top dead center position, and as the pressure rises in both the prechamber 75 and main chamber 66, fuel is injected by the injector 89 and, due to the high temperature in the prechamber, will ignite, burn, and expand. This expansion occurs also through the throat 86 so as to fire the charge in the main chamber 66 and complete the combustion and the driving of the piston 54 downwardly.

As the piston 54 is driven downwardly, eventually an exhaust port 93 formed at the cylinder bore end of an exhaust passage 94 extending through the cylinder block 52 will open and the exhaust gases can be discharged to the atmosphere through an exhaust system (not shown).

If desired, there may be provided an auxiliary exhaust port 95 in which an exhaust control valve 96 is positioned for controlling the effective compression ratio of the engine 51, as is known in this art. The auxiliary exhaust passage 95 and main exhaust passage 94 are formed diametrically opposite the center scavenge passage 69.

The engine 51 may also be provided with an arrangement for reducing the scavenging airflow under some conditions, and this is accomplished by providing a manifold 97 that communicates the crankcase chambers 59 with each other when control valves 98 are open. When these control valves 98 are open, the pressure in the crankcase chambers 59 will be slightly reduced, and the amount of scavenging airflow will be reduced. This type of construction is now known in the art.

The engine 51 is water cooled and to this end both the cylinder block 52 and cylinder head members 71 are water jacketed as at 99. Water is circulated through these jackets 99 in any desired flow pattern by an appropriate coolant pump (not shown).

Figure 8:
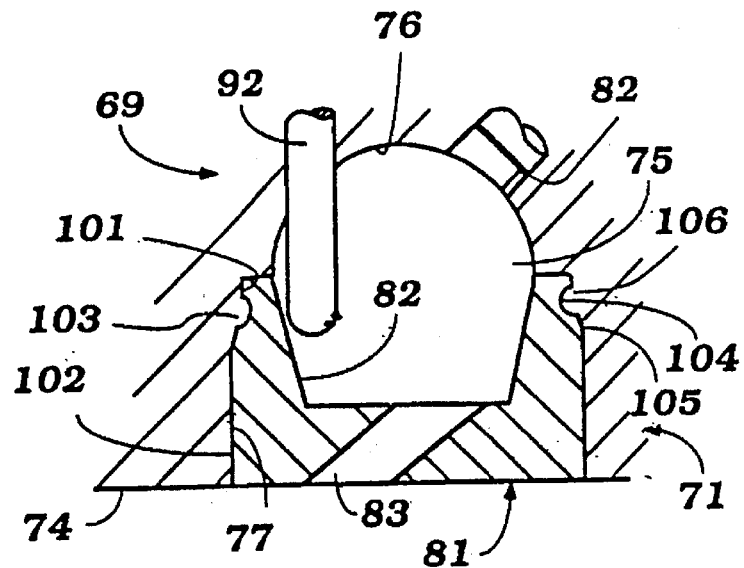
FIG. 8 is a cross-sectional view, in part similar to FIG. 5, and shows a second embodiment of the invention.

FIG. 8 shows another embodiment of the invention, which is generally similar to the embodiment of FIGS. 2–7 and differs only in the way in which the mechanical and welded bond is formed between the insert piece 81 and the main cylinder head member 71. For that reason, only a single figure is believed to be necessary to illustrate and describe this embodiment, and in this single figure components that are the same or substantially the same have been identified by the same reference numerals and will be described again only insofar as is necessary to understand the construction and operation of this embodiment.

In this embodiment, the counterbore 77 is formed with a smaller diameter portion 101 adjacent its upper end, and the insert piece 81 has a lower larger-diameter portion 102 and a smaller-diameter portion 103 with a recess 104 formed therebetween. A rounded section 105 is formed at the upper end of the larger-diameter portion 102 of the insert piece where it merges into the recess 104 so as to assist in deforming a portion 106 of the cylinder head member 71 into the recess 104 as the insert piece 81 is pressed into the cylinder head. Again, electric current may be applied and the outer surface of the insert piece 81 is treated by aluminizing or copper plating so as to assist in the welding operation. Like the previously described embodiment, the welding operation can be deleted and only a mechanical bond formed if desired.

Figure 9:
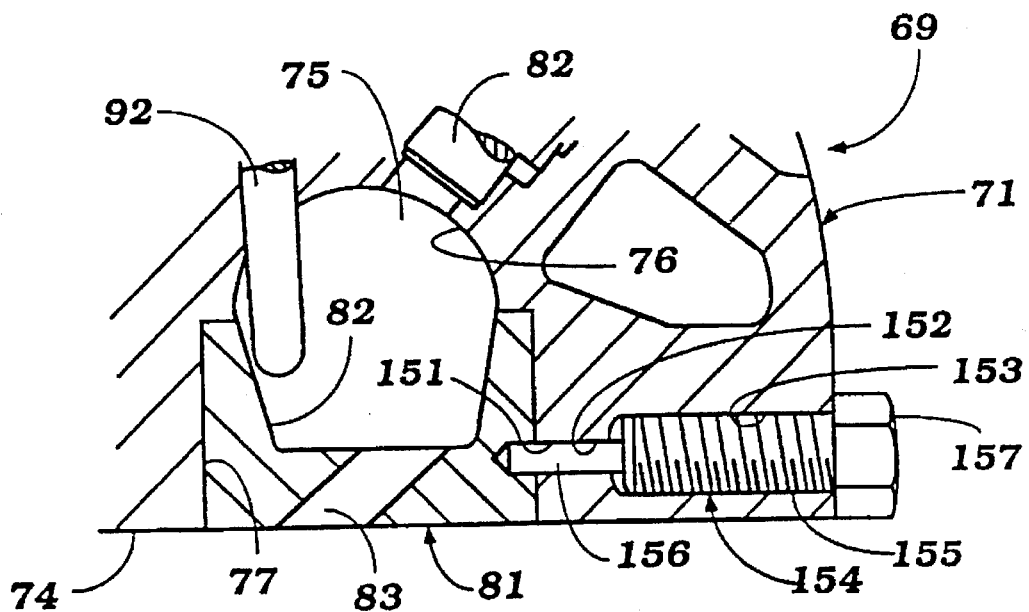
FIG. 9 is a cross-sectional view, in part similar to FIGS. 5 and 8, and shows a third embodiment of the invention.

FIG. 9 shows another embodiment of the invention, which differs from the previously described embodiments only in the way in which the insert piece 81 is affixed to the cylinder head member 71. For that reason, components that are the same as those previously described have been identified by the same reference numerals and will not be described again except insofar as is necessary to understand the construction and operation of this embodiment. In this embodiment, the cylinder head counterbore 77 has a uniform diameter through its length, as does the outer surface of the insert piece 81.

The insert piece 81 is, however, provided with a bore 151 that extends through it and which is aligned with a bore 152 formed through the outer side of the cylinder head member 71. The outer end of the bore 151 is counterbored and tapped at 153 so as to receive a locking member, indicated generally by the reference numeral 154. The locking member 154 has a threaded portion 155 that is screwed into the cylinder head threads 153 and a locking portion 156 that has a generally cylindrical configuration and which is received in the insert bore 151 so as to locate it and lock it in place. A head 157 is formed on the fastener 154 so that it can be tightened in place and lock the insert piece 81 to the cylinder head member 71.

The embodiment of FIG. 9 has certain advantages over the previously described embodiments in that it does not require a welding or metal-upsetting technique to fix the insert piece 81 to the cylinder head member 71.

Another embodiment of the invention is shown in FIG. 10, and again this embodiment differs only from the previously described embodiments in the way in which the insert piece 81 is affixed to the cylinder head member 71. For that reason, portions of the construction that are the same or substantially the same as those previously described have been identified by the same reference numerals and will be described again only insofar as is necessary to understand the construction and operation of this embodiment.

In this embodiment the insert piece 81 has a stepped outer periphery comprised of a first larger-diameter portion 201 and a second smaller-diameter portion 202. The cylinder head member 71 is formed with a bore 203, which is complementary to the portion 201, and a further bore 204, which is larger in diameter and forms a shoulder 205. A locking piece 206 having a generally tapered outer configuration is received in the larger bore 204 against the shoulder 205 and is formed from a material that can be easily welded to the material of the cylinder head 71, such as aluminum or aluminum alloy. A circumferential weld 207 is then laid up in the lower surface of the cylinder head member 79 to complete the affixation. Since this surface is readily exposed, the welding operation can be quite simple, and the sealing will be very effective.

It should be readily apparent from the foregoing description that the described embodiments of the invention are very effective in providing an arrangement for forming a prechamber in a cylinder head while minimizing the number of pieces that are employed and ensuring that the insert piece, although made from a material different from the cylinder head, can be positively locked in place and resist the effects of different thermal expansions and rates of heat transfer. Of course, the foregoing description is that of the preferred embodiments of the invention, and various changes and modifications may be made without departing from the spirit and scope of the invention, as defined by the appended claims.

I claim:

1. An internal combustion engine comprised of a cylinder head member having a first surface adapted for sealing relation around a cylinder bore of an associated cylinder block, said first surface surrounding a second surface forming in part a main combustion chamber, said cylinder head member defining a cavity in said second surface forming at least in part a precombustion chamber, a counter bore formed in said cylinder head member at the combustion chamber end of said cavity, an insert piece extending at least in part into said cavity for enclosing said cavity and forming in further part said precombustion chamber, an opening in said insert piece communicating said precombustion chamber with said combustion chamber, and interlocking means carried by said insert piece and said cylinder head member comprised of a locking ring received in said counter bore and wedging means cooperating with said locking ring, said cylinder head member, and said insert piece for affixing said insert piece to said cylinder head member, and wherein the wedging means comprises a second ring received within the counter bore.

2. The internal combustion engine of claim 1, wherein the insert piece is provided with a shoulder that is aligned with a base of the counter bore and wherein the locking ring is abuttingly engaged with said insert piece shoulder and said counter bore base.

3. The internal combustion engine of claim 2, wherein the locking ring has a tapered outer surface and wherein the second ring has a tapered surface engageable with the tapered surface of the locking ring and with the cylinder head member.

4. An internal combustion engine comprised of a cylinder head member having a first surface adapted for sealing relation around a cylinder bore of an associated cylinder block, said first surface surrounding a second surface forming in part a main combustion chamber, said cylinder head member defining a cavity in said second surface forming at least in part a precombustion chamber, a counter bore formed in said cylinder head member at the combustion chamber end of said cavity, an insert piece extending at least in part into said cavity for enclosing said cavity and forming in further part said precombustion chamber, an opening in said insert piece communicating said precombustion chamber with said combustion chamber, and interlocking means carded by said insert piece and said cylinder head member comprised of a tapered locking ring received in said counter bore and wedging means cooperating with said tapered locking ring, said cylinder head member, and said insert piece for affixing said insert piece to said cylinder head member.

5. An internal combustion engine comprised of a cylinder head member having a first surface adapted for sealing relation around a cylinder bore of an associated cylinder block, said first surface surrounding a second surface forming in part a main combustion chamber, said cylinder head member defining a cavity in said second surface forming at least in part a precombustion chamber, a counter bore formed in said cylinder head member at the combustion chamber end of said cavity, an insert piece extending at least in part into said cavity for enclosing said cavity and forming in further part said precombustion chamber, an opening in said insert piece communicating said precombustion chamber with said combustion chamber, and interlocking means carried by said insert piece and said cylinder head member comprised of a locking ring received in said counter bore, said locking ring having at least one tapered area, and wedging means cooperating with said locking ring, said wedging means comprising at least one member having at least one tapered area thereon for engagement with said tapered area on said locking ring, said wedging means cooperating with said locking ring, said cylinder head member and said insert piece for affixing said insert piece to said cylinder head member.

* * * * *